(12) United States Patent
Ogawa (10) Patent No.: US 12,181,034 B2
(45) Date of Patent: Dec. 31, 2024

(54) DRIVING TRANSMISSION DEVICE, DRIVING DEVICE AND IMAGE FORMING APPARATUS

(71) Applicant: KYOCERA Document Solutions Inc., Osaka (JP)

(72) Inventor: Naozumi Ogawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 185 days.

(21) Appl. No.: 18/054,088

(22) Filed: Nov. 9, 2022

(65) Prior Publication Data

US 2023/0152747 A1 May 18, 2023

(30) Foreign Application Priority Data

Nov. 12, 2021 (JP) .................................. 2021-185205

(51) Int. Cl.
*F16H 57/021* (2012.01)
*G03G 15/20* (2006.01)
*G03G 21/16* (2006.01)

(52) U.S. Cl.
CPC ........ *F16H 57/021* (2013.01); *G03G 15/2053* (2013.01); *G03G 21/1685* (2013.01); *G03G 2215/00016* (2013.01); *G03G 2215/00156* (2013.01)

(58) Field of Classification Search
CPC ................ F16H 57/021; G03G 15/757; G03G 21/1685; G03G 21/1857; G03G 2215/00016; G03G 2215/00156; F16C 17/02; F16C 35/02
See application file for complete search history.

(56) References Cited

U.S. PATENT DOCUMENTS

2019/0265631 A1* 8/2019 Nagashima ........ G03G 15/0189

FOREIGN PATENT DOCUMENTS

JP 2008-261383 A 10/2008

OTHER PUBLICATIONS

English translation of JP 2008261383 A (Year: 2008).*
Schaeffler, "Design of bearing arrangements." Aug. 9, 2021. Jul. 8, 2024 [https://medias.schaeffler.us/en/knowledgebase/design-of-bearing-arrangements]. Internet Archive [https://web.archive.org/web/20211109063220/https://medias.schaeffler.us/en/knowledgebase/design-of-bearing-arrangements] (Year: 2021).*

* cited by examiner

*Primary Examiner* — Joseph Brown
(74) *Attorney, Agent, or Firm* — Studebaker & Brackett PC (57) ABSTRACT

A driving transmission device includes a storage part, a fixing pin and a supporting part. The storage part has a through hole. The fixing pin rotatably supports a gear. To the supporting part, the fixing pin is fixed. A hole side chamfered portion is formed at an outside opening edge of the through hole. A shaft side chamfered portion is formed at the tip end portion of the fixing pin. A lubricant is applied to a contact area between the fixing pin and the through hole. A hole side boundary portion between an inner circumferential surface of the through hole and the hole side chamfered portion is in contact with an outer circumferential surface of the fixing pin. A shaft side boundary portion between an outer circumferential surface of the fixing pin and the shaft side chamfered portion faces the hole side chamfered portion with a gap.

5 Claims, 7 Drawing Sheets

DRIVING TRANSMISSION DEVICE, DRIVING DEVICE AND IMAGE FORMING APPARATUS

INCORPORATION BY REFERENCE

This application is based on and claims the benefit of priority from Japanese patent application No. 2021-185205 filed on Nov. 12, 2021, which is incorporated by reference in its entirety.

BACKGROUND

The present disclosure relates to a driving transmission device, a driving device and an image forming apparatus.

A driving unit in which a fixing pin is provided in a pair of supporting parts, and an idle gear is rotatably supported by the fixing pin is disclosed. A D-cut portion is formed at one end portion of the fixing pin, and the D-cut portion is fixed to one supporting part in a non-rotatable manner. The other end portion of the fixing pin is fitted in a hole opened in the other supporting part.

When the driving unit as described above is assembled, a lubricant such as a grease is often applied to the contact area between the fixing pin and the hole of the supporting part. Depending on a type of the lubricant and a material of the supporting part, the lubricant applied area may be deteriorated. On the other hand, when the driving unit is used, since the fixing pin and the supporting part continue to receive a load such as a vibration caused by the rotation of the idle gear, a phenomenon (a creep deformation) in which the distortion of the fixing pin and the supporting part increases with the lapse of time occurs. When the creep deformation occurs on the area deteriorated by the applying of the lubricant, a crack (a chemical crack) may occur on the area.

SUMMARY

In accordance with an aspect of the present disclosure, a driving transmission device includes a storage part, a fixing pin and a supporting part. The storage part houses a gear and has a through hole formed corresponding to the gear. The fixing pin rotatably supports the gear. To the supporting part, the fixing pin is fixed in a state where a tip end portion of the fixing pin is inserted into the through hole. A hole side chamfered portion in which a corner is notched is formed at an outside opening edge portion of the through hole. A shaft side chamfered portion in which a corner is notched is formed at the tip end portion of the fixing pin. In a state where the fixing pin is inserted into the through hole, a lubricant is applied to a contact area between the fixing pin and the through hole. A hole side boundary portion which is a boundary between an inner circumferential surface of the through hole and the hole side chamfered portion is in contact with an outer circumferential surface of the fixing pin. A shaft side boundary portion which is a boundary between an outer circumferential surface of the fixing pin and the shaft side chamfered portion faces the hole side chamfered portion with a gap.

In accordance with an aspect of the present disclosure, a driving device includes a driving source for driving a driven object; and the driving transmission device which transmits a driving force of the driving source to the driven object.

In accordance with an aspect of the present disclosure, an image forming apparatus includes the driving device.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Hereinafter, with reference to the attached drawings, an embodiment of the present disclosure will be described. The reference numerals Fr, Rr, L, R, U, and D in the drawings indicate the front, rear, left, right, upper and lower. Although the terms used herein refer to the direction and the position, these terms are used for convenience of explanation and do not limit the technical scope of the present disclosure.

Figure 1:
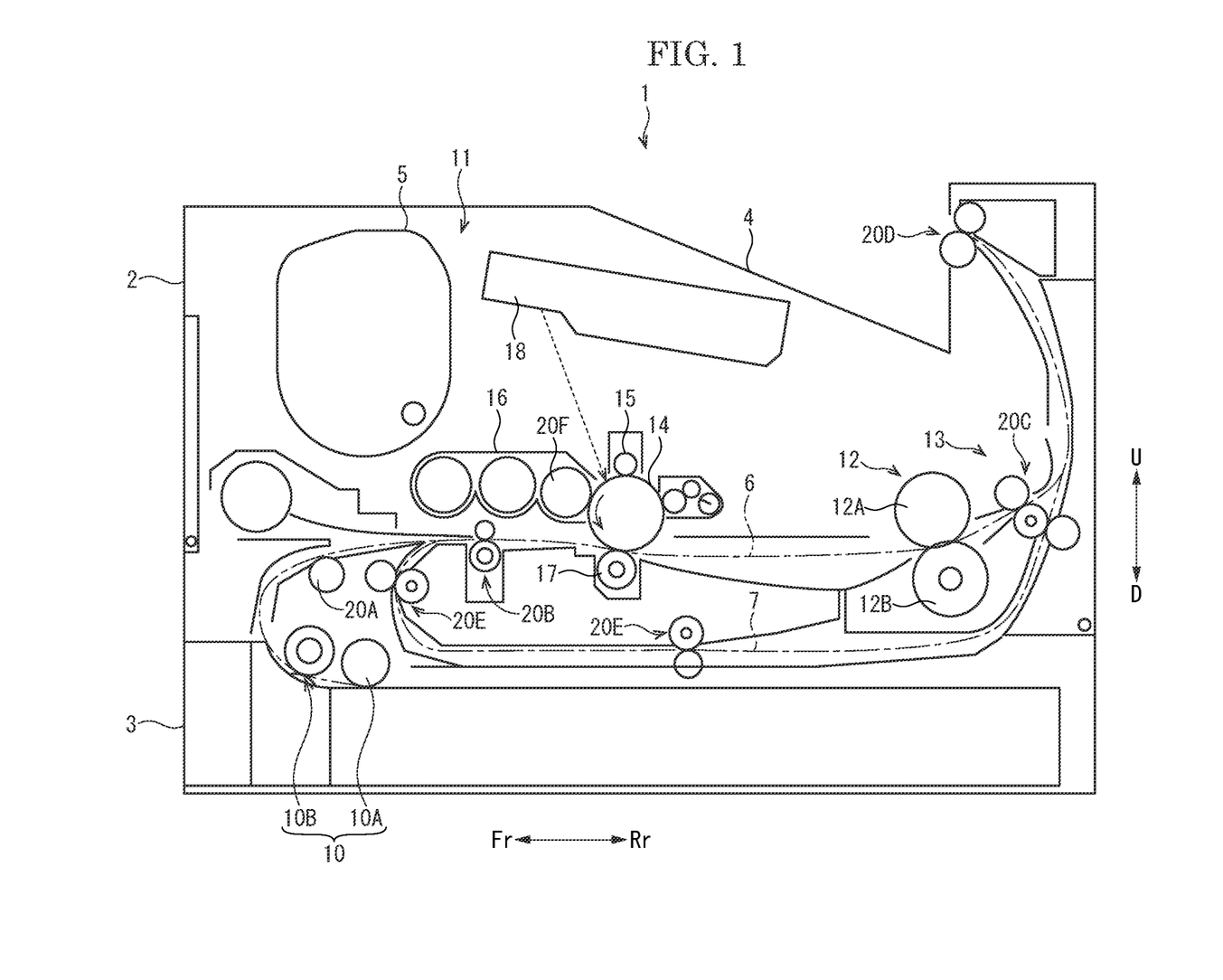
FIG. 1 is a front view schematically showing an inner structure of an image forming apparatus according to one embodiment of the present disclosure.

With reference to FIG. 1, an image forming apparatus 1 according to one embodiment will be described. FIG. 1 is a front view schematically showing the inside of the image forming apparatus 1.

The image forming apparatus 1 is a printer which forms an image by transferring a toner image formed by an electrophotographic method to a sheet (not shown). As shown in FIG. 1, the image forming apparatus 1 includes an apparatus main body 2 constituting a substantially rectangular parallelepiped appearance. In the lower portion of the apparatus main body 2, a sheet feeding cassette 3 in which the sheet is stored is detachably provided, for example. On the upper surface of the apparatus main body 2, a sheet discharge tray 4 is provided. In the upper portion of the inside of the apparatus main body 2, a toner container 5 in which a toner (a developer) for replenishment is contained is detachably attached. The sheet as an example of the medium is not limited to a paper sheet, but may be a resin sheet or the like.

Inside the apparatus main body 2, a conveyance path 6 and an inversion conveyance path 7 which serve as a path along which the sheet is conveyed are formed. The conveyance path 6 is formed in a substantially S-shape from the front lower portion to the rear upper portion of the apparatus main body 2, and is a path along which the sheet is conveyed from the sheet feeding cassette 3 to the sheet discharge tray 4. The inversion conveyance path 7 branches downward from the downstream side portion of the conveyance path 6, extends forward, and merges with the upstream side portion of the conveyance path 6. The inversion conveyance path 7 is a path along which the sheet is turned upside down and conveyed again to an image forming device 11 (to be described later). In this specification, the term "upstream and downstream" refers to "upstream and downstream" in the conveying direction of the sheet (the medium).

The image forming apparatus 1 includes a sheet feeding device 10, the image forming device 11, a fixing device 12, and a conveying device 13. The sheet feeding device 10 is provided at the upstream end of the conveyance path 6, the image forming device 11 is provided at an intermediate portion of the conveyance path 6, and the fixing device 12 is provided at a downstream side portion of the conveyance path 6. The conveying device 13 is provided in suitable positions on the conveyance path 6 and the inversion conveyance path 7.

<Sheet Feeding Device> The sheet feeding device 10 includes a pickup roller 10A and a sheet feeding rollers pair 10B. The pickup roller 10A takes out the uppermost sheet from the sheet bundle stored in the sheet feeding cassette 3. The sheet feeding rollers pair 10B separates the sheets taken out by the pickup roller 10A one by one and conveys it toward the downstream side.

<Imaging Forming Device> The image forming device 11 includes a photosensitive drum 14, a charging device 15, a developing device 16, a transferring roller 17 and an optical scanning device 18. The photosensitive drum 14 is formed into a substantially cylindrical shape long in the left-and-right direction, and is driven by a motor (not shown) to be rotated around an axis. The charging device 15, the developing device 16, and the transferring roller 17 are arranged around the photosensitive drum 14 in the order of the image forming process. The transferring roller 17 is brought into contact with the photosensitive drum 14 from below to form a transferring nip. The optical scanning device 18 is provided above the photosensitive drum 14, and emits scanning light toward the surface of the photosensitive drum 14.

<Fixing Device> The fixing device 12 includes a fixing belt 12A and a pressuring roller 12B. The fixing belt 12A and the pressuring roller 12B are formed into a substantially cylindrical shape long in the left-and-right direction, and are rotatably supported by a case (not shown). Inside the fixing belt 12A, a heater (not shown) for heating the fixing belt 12A is provided. The pressuring roller 12B is pressed against the fixing belt 12A from below to form a fixing nip. The pressuring roller 12B is driven by a motor (not shown) to be rotated around an axis, and the fixing belt 12A rotates following the pressuring roller 12B.

Figure 2:
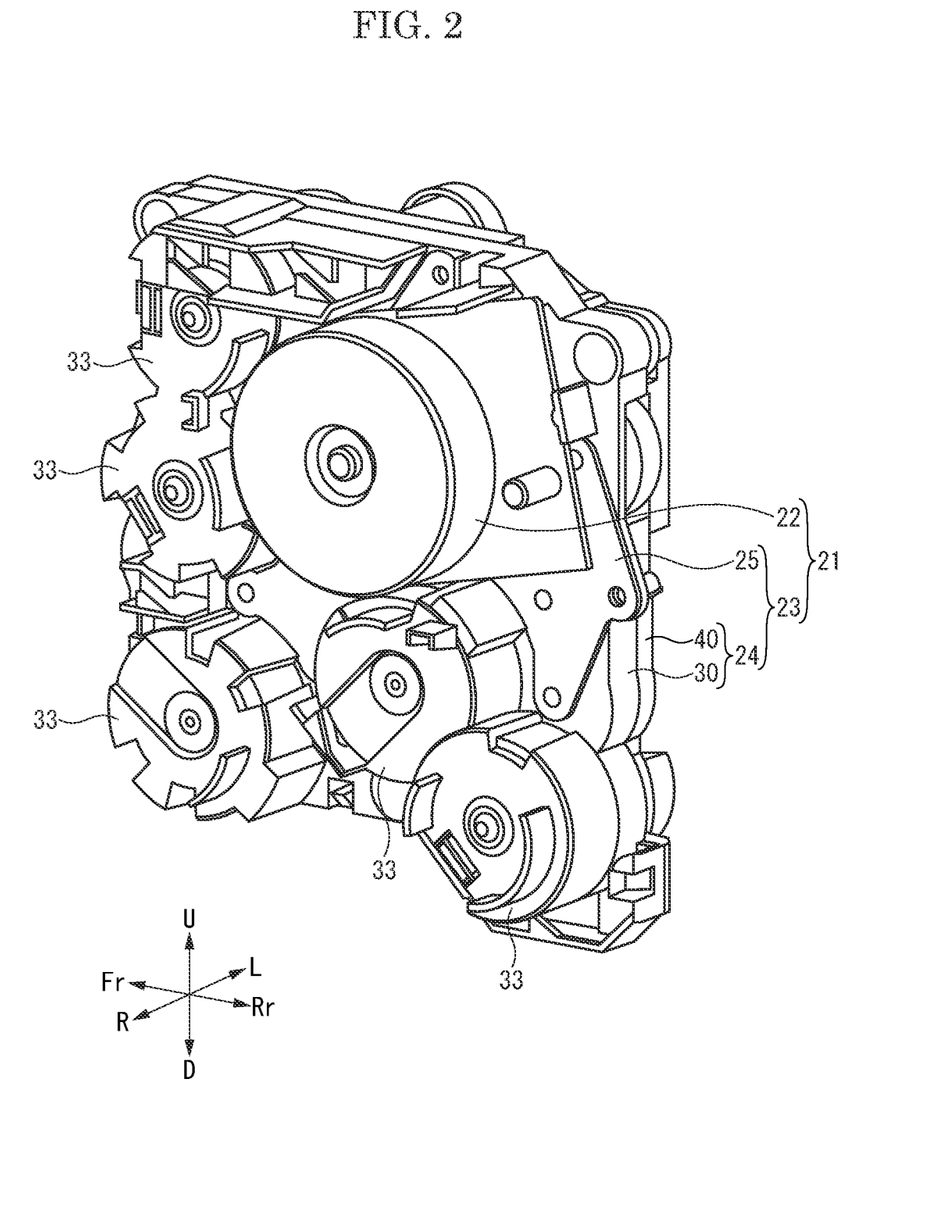
FIG. 2 is a perspective view showing a driving device according to the embodiment of the present disclosure.

<Conveying Device> The conveying device 13 includes a feeding roller 20A, a registration rollers pair 20B, a conveying rollers pair 20C, a discharging rollers pair 20D, two double-sided conveying rollers pairs 20E, and a driving device 21 (see FIG. 2). The feeding roller 20A, the registration rollers pair 20B, the conveying rollers pair 20C, and the sheet discharging rollers pair 20D are disposed on the upstream side portion of the conveyance path 6, and the two double-sided conveying rollers pairs 20E are disposed on the inversion conveyance path 7. The driving device 21 drives the feeding roller 20A and the others described above to be rotated.

The feeding roller 20A is disposed on the downstream side of the sheet feeding rollers pair 10B, and conveys the sheet passed the sheet feeding rollers pair 10B. The registration rollers pair 20B is disposed between the feeding roller 20A and the transferring roller 17, and temporality stops the conveyed sheet to correct the inclination (the skew) of the sheet. The conveying rollers pair 20C is disposed on the downstream side of the fixing device 12, and conveys the sheet passed the fixing nip. The discharging rollers pair 20D is disposed on the downstream end of the conveyance path 6, and discharges the sheet passed the conveying rollers pair 20C to the discharge tray 4. The discharging rollers pair 20D switches back the sheet in which an image is formed on the front face, and then sends it to the inversion conveyance path 7. The two double-sided conveying rollers pairs 20E convey the sheet sent by the discharging rollers pair 20D. The inversion conveyance path 7 is merged with the conveyance path 6 between the feeding roller 20A and the registration rollers pair 20B.

The driving device 21 is supported by an internal frame (not shown) of the apparatus main body 2, and drives the feeding roller 20A and one or both rollers of each rollers pair 20B to 20E to rotate them around their axes. Further, the driving device 21 drives the developing roller 20F stored in the developing device 16 to rotate it around an axis. The feeding roller 20A, the rollers pairs 20B to 20E, and the developing roller 20F are examples of the driven object, and other members other than those may be driven by the driving device 21. In the following description, the feeding roller 20A, the rollers pairs 20B to 20E, and the developing roller 20F are collectively referred to as the "driven roller 20" for convenience of explanation.

[Image Forming Process] The operation of the image forming apparatus 1 will be described. A controller (not shown) executes image forming processing (control) based on image data inputted from an external terminal as follows.

The charging device 15 charges the surface of the photosensitive drum 14. The optical scanning device 18 exposes the photosensitive drum 14 and forms an electrostatic latent image corresponding to the image data on the surface of the photosensitive drum 14. The developing device 16 develops the electrostatic latent image on the photosensitive drum 14 to a toner image by using the toner supplied from the toner container 5.

The sheet feeding device 10 separates the sheets in the sheet feeding cassette 3 one by one and feeds it to the conveyance path 6. The registration rollers pair 20B sends the skew corrected sheet toward the transferring nip at a predetermined timing. The transferring roller 17 transfers the toner image on the photosensitive drum 14 to the surface of the sheet passing through the transferring nip. The fixing device 12 thermally fixes the toner image on the sheet by passing the sheet between the fixing belt 12A and the pressuring roller 12B which are rotated around their axes (the fixing nip). In the case of one-sided printing, the sheet discharging rollers pair 20D discharges the sheet on which the toner image is fixed to the sheet discharge tray 4.

In the case of double-sided printing, the sheet discharging rollers pair 20D switches back the sheet, and sends it to the inversion conveyance path 7. The two double-sided conveying rollers pairs 20E convey the sheet along the inversion conveyance path 7, and the sheet enters the conveyance path 6 again from the inversion conveyance path 7. Then, an image is also formed on the back surface of the sheet by the same procedure as in the above-described single-sided printing, and the double-sided printed sheet is discharged to the sheet discharge tray 4.

Figure 3:
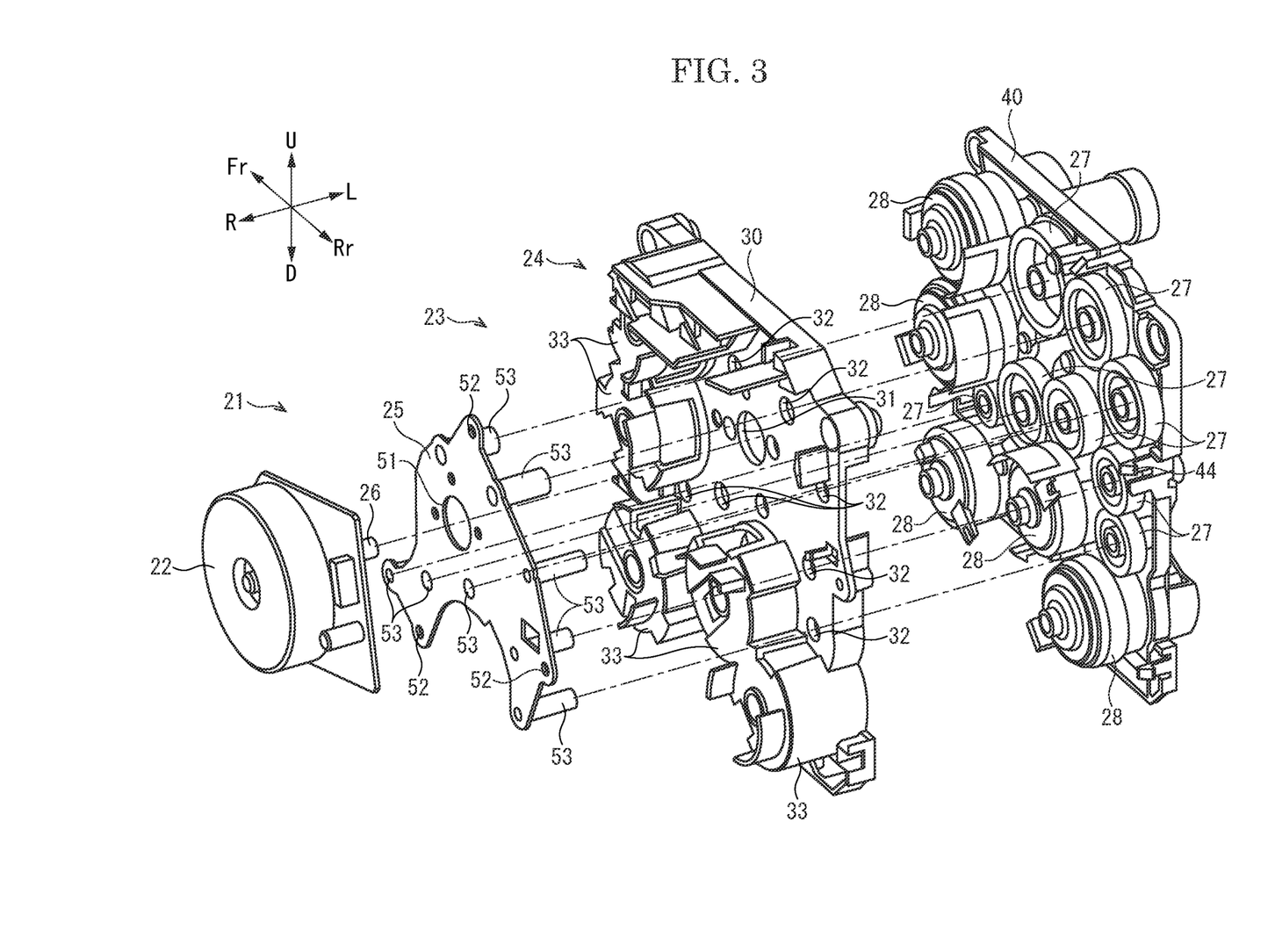
FIG. 3 is a disassembled perspective view showing the driving device according to the embodiment of the present disclosure.
Figure 4:
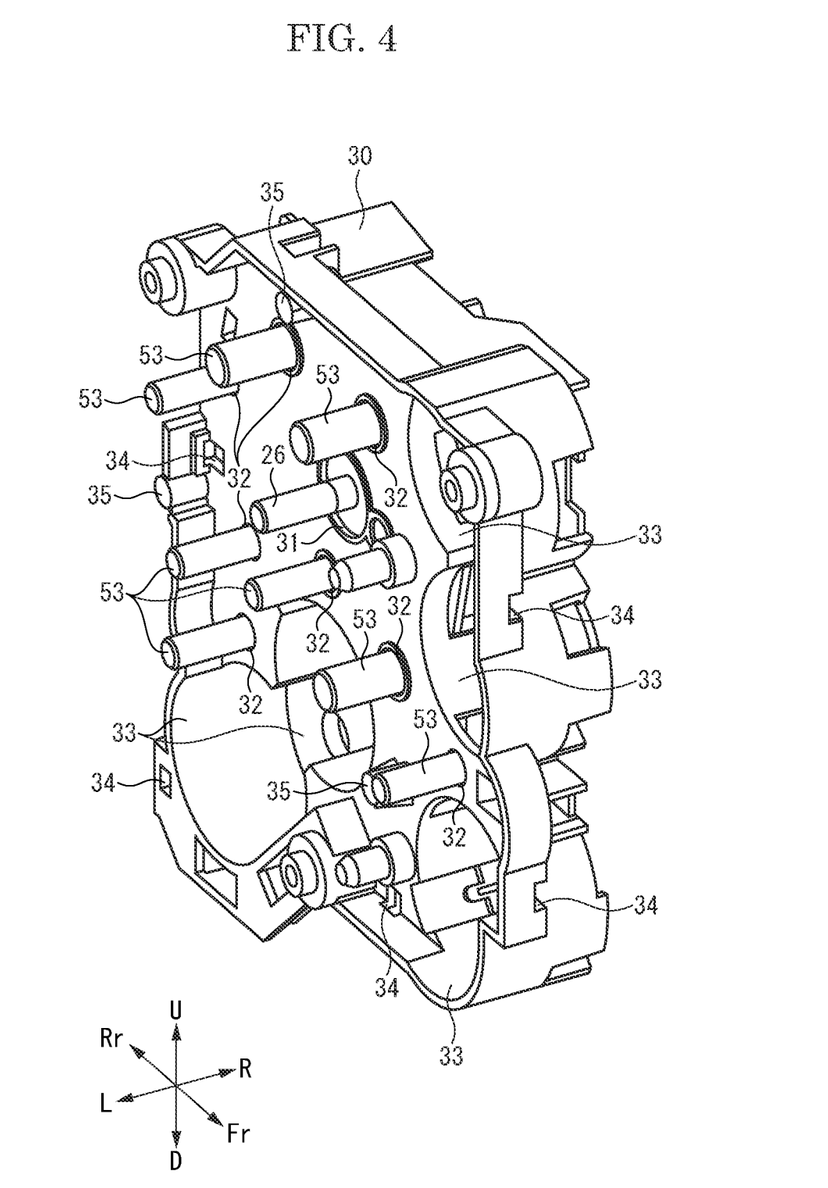
FIG. 4 is a perspective view showing a first cover and the others of a driving transmission device according to the embodiment of the present disclosure.
Figure 5:
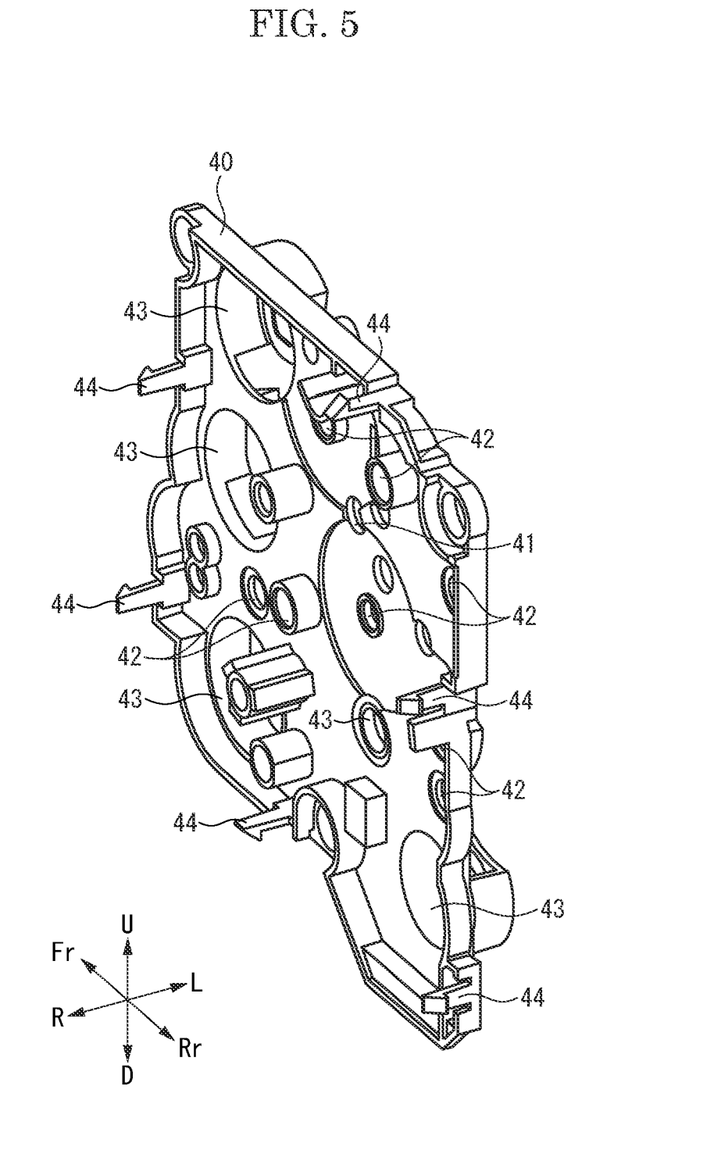
FIG. 5 is a perspective view showing a second cover and the others of the driving transmission device according to the embodiment of the present disclosure.
Figure 6:
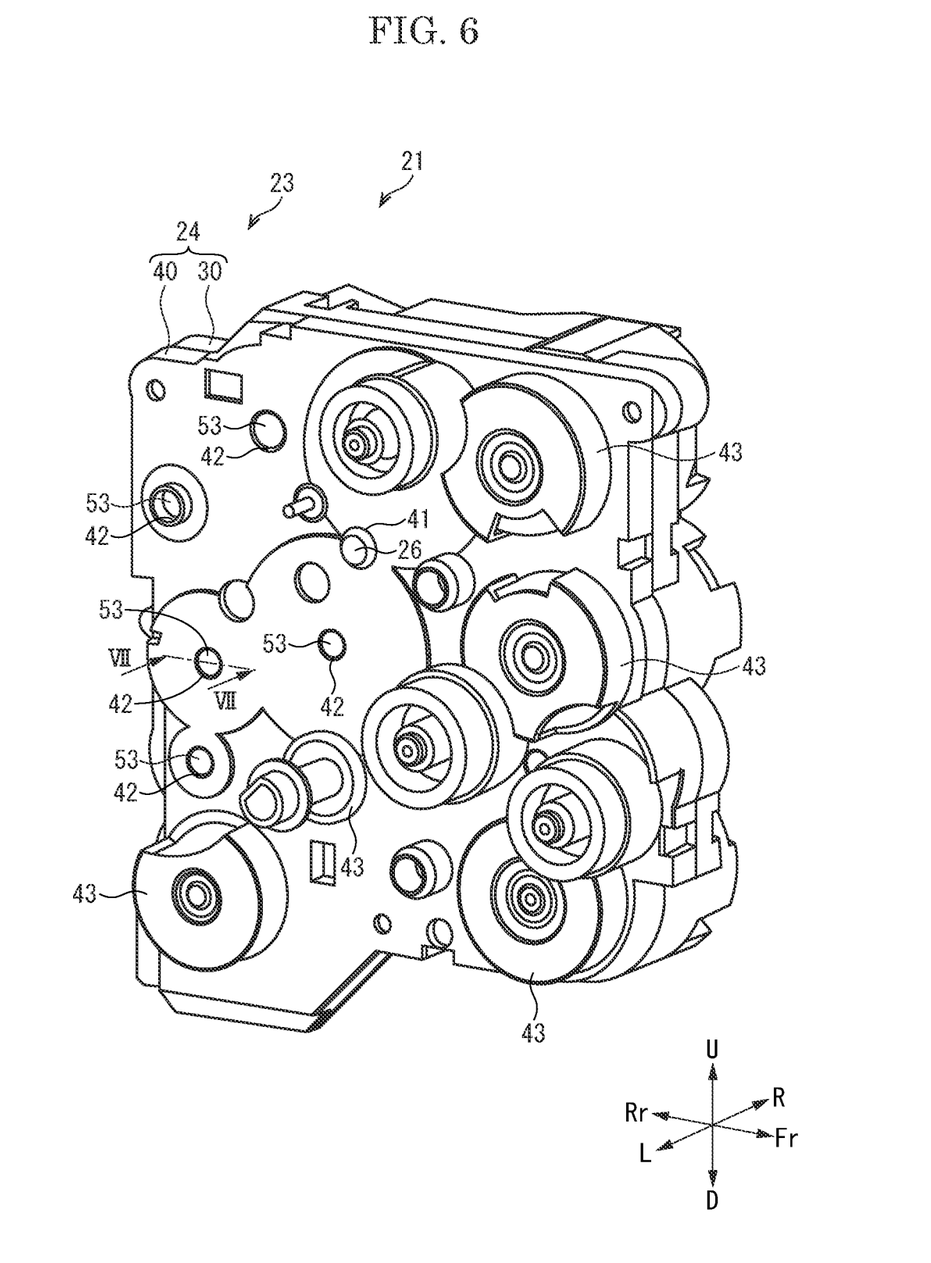
FIG. 6 is a perspective view showing the driving device according to the embodiment of the present disclosure.

[Driving Device] Next, with reference to FIG. 2 to FIG. 6, the driving device 21 will be described in detail. FIG. 2 is a perspective view showing the driving device 21. FIG. 3 is a disassembled perspective view showing the driving device 21. FIG. 4 is a perspective view showing a first cover member 30 and the others of the driving transmission device 23. FIG. 5 is a perspective view showing a second cover member 40 and the others of the driving transmission device 23. FIG. 6 is a perspective view showing the driving device 21 (its left side portion).

As shown in FIG. 2 and FIG. 3, the driving device 21 includes a driving motor 22 and a driving transmission device 23.

<Driving Motor> The driving motor 22 as an example of the driving source is a stepping motor capable of positioning control, for example. The driving motor 22 generates a driving force for driving the driven roller 20.

<Driving Transmission Device> The driving transmission device 23 has a function of transmitting the driving force of the driving motor 22 to the driven roller 20. The driving transmission device 23 includes a storage part 24 and a supporting part 25.

(Storage Part) The storage part 24 is a case in which a plurality of gears 27 and a plurality of clutches 28 are stored. As shown in FIG. 3, the adjacently disposed gears 27 are meshed with each other to form a gear train. One gear 27 is meshed with a driving gear (not shown) fixed the driving shaft 26 of the driving motor 22, and transmits the rotating force to other gears 27. Each clutch 28 has a gear portion (not shown) meshed with one of the plurality of gears 27 and a clutch shaft (not shown) which transmits the driving force to one of the driven rollers 20. Each clutch 28 is controlled by the controller and has a function of being switched into an ON state where the rotating driving force applied from the gear 27 is transmitted to the clutch shaft and into an OFF state where the transmission of the rotating driving force to the clutch shaft is blocked. The detailed description of the meshing relation of the respective gears 27 and the detailed description of the connection relation between the respective clutches 28 and the respective driven rollers 20 will be omitted.

The storage part 24 is made of synthetic resin (polycarbonate resin, acrylonitrile-butadiene-styrene synthetic resin, or the like), for example, and is formed into a substantially rectangular parallelepiped shape having a thin thickness in the left-and-right direction (see FIG. 2). The storage part 24 has a first cover member 30 constituting the right side portion of the storage part 24 and a second cover member 40 constituting the left side portion of the storage part 24. The first cover member 30 and the second cover member 40 face each other across a space in which the gear train is stored.

(First Cover Member) As shown in FIG. 3 and FIG. 4, the first cover member 30 is formed into a tray shape with almost the left side thereof opened. A plurality of engagement holes 34 are opened in the outer peripheral portion of the first cover member 30 (see FIG. 4). FIG. 4 shows only a part of the plurality of engagement holes 34.

The first cover member 30 has a first opening part 31, a plurality of first through holes 32, and a plurality of clutch storage portions 33. The first opening part 31 is a hole into which the driving shaft 26 of the driving motor 22 is inserted. The plurality of first through holes 32 are circular holes formed corresponding to the plurality of gears 27. A fixing pin 53 (described later) which supports the gear 27 rotatably is inserted into each of the first through holes 32. The diameter (the inner diameter) of the first through hole 32 is set larger than the outer diameter of the fixing pin 53, and the fixing pin 53 penetrates the first through hole 32 with play. Each of the clutch storage portions 33 is a recess in which the clutch 28 is fitted.

(Second Cover Member) As shown in FIG. 3, FIG. 5, and FIG. 6, the second cover member 40 is formed into a tray shape with almost the right side opened. A plurality of engagement portions 44 protruding rightward are formed on the outer peripheral portion of the second cover member 40 (see FIG. 5). Each engagement portion 44 is engaged with the engagement hole 34 of the first cover member 30, so that the first cover member 30 and the second cover member 40 are coupled to each other to form the space in which the gear train is stored.

As shown in FIG. 5 and FIG. 6, the second cover member 40 has a second opening part 41, a plurality of second through holes 42, and a plurality of gear storage portions 43. The second opening part 41 is a bearing in which the driving shaft 26 of the driving motor 22 is rotatably supported. The plurality of second through holes 42 are holes formed corresponding to the plurality of gears 27. The tip end portion of the fixing pin 53 penetrating through the first through hole 32 is inserted into each second through hole 42. The diameter (the inner diameter) of the second through hole 42 is set slightly larger than the outer diameter of the fixing pin 53, and the tip end portion of the fixing pin 53 is fitted into the first through hole 32 with almost no play. Each gear storage portion 43 is a recess in which the clutch shaft of the clutch 28 is rotatably supported and the gear portion of the clutch 28 is stored. In FIG. 6, a part of the plurality of second through holes 42 is hidden by an external gear.

(Supporting Part) As shown in FIG. 3, the supporting part 25 is made of metal (iron, stainless steel, aluminum alloy, or the like), for example, and formed into a flat plate shape. A supporting opening 51 into which the driving shaft 26 of the driving motor 22 is penetrated is opened in the supporting part 25. The driving shaft 26 is inserted into the supporting opening 51 from the right to the left, and the driving motor 22 is screwed and fixed to the right surface of the supporting part 25. A plurality of free insertion holes 52 through which screws (not shown) are passed are opened in the supporting part 25, and a plurality of screw holes 35 are formed in the first cover member 30 at positions corresponding to the plurality of free insertion holes 52 (see FIG. 4).

(Fixing Pin) As shown in FIG. 3, a plurality of fixing pins 53 are fixed to the supporting part 25 at positions corresponding to the plurality of gears 27 (the first and second through holes 32, 42). Each of the fixing pins 53 is made of metal (iron, stainless steel, aluminum alloy, or the like), for example, and formed into a substantially cylindrical shape, and is fixed to the left surface of the supporting part 25 by caulking. Each of the fixing pins 53 extends rightward from the left surface of the supporting part 25. Each of the fixing pins 53 rotatably supports the gear 27 in a state where it penetrates the storage part 24 and its tip end portion is inserted into each of the second through holes 42. The fixing method of the fixing pin 53 to the supporting part 25 may be screw fastening or welding.

Here, a case where the driving device 21 is assembled will be briefly described. The supporting part 25 to which the driving motor 22 is fixed is disposed on the right side of the storage part 24, and the driving shaft 26 passes through the first opening part 31 of the first cover member 30 from the right to the left (see FIG. 4), and is inserted into the second opening part 41 of the second cover member 40 (see FIG. 6). Each of the fixing pins 53 is inserted into the first through hole 32 of the first cover member 30 from the right side to the left side (see FIG. 4), penetrates the axial center portion of the gear 27, and is inserted into the second through hole 42 of the second cover member 40 (see FIG. 6). In this state, the driving gear of the driving motor 22 is meshed with one gear 27, and each gear 27 is rotatably supported on the circumferential surface of the fixing pin 53. The screw penetrating each free insertion hole 52 of the supporting part 25 is screwed into the screw hole 35 of the first cover member 30, so that the supporting part 25 is fixed to the first cover member 30. The supporting part 25 may be fixed to the apparatus main body 2 in place of the storage part 24 (not shown).

Next, the operation of the driving device 21 will be briefly described. The driving motor 22 is driven under the control of the controller. The rotating driving force of the driving motor 22 is transmitted to the driven roller 20 through the plurality of gears 27 (gear train). When the respective clutches 28 are controlled by the controller to be switched to the ON state or the OFF state, only the selected driven roller 20 can be rotated (or stopped).

When the driving device 21 (or the driving transmission device 23) is assembled, a lubricant (for example, a lubricating oil containing polyα-olefin as a main component) is applied to the tip end portion of each of the fixing pins 53 in order to smoothly fit the plurality of fixing pins 53 into the plurality of second through holes 42. Therefore, in a state where the fixing pin 53 is inserted into the second through hole 42, the lubricant is provided in the contact area P between the fixing pin 53 and the second through hole 42 (the inner circumferential surface 47 of the second through hole 42). In general, since the synthetic resin is more likely to be deteriorated due to the adhesion of the lubricant than the metal, in the second cover member 40 made of the synthetic resin, the inner circumferential surface 47 of the second through hole 42, which is applied with the lubricant, may be deteriorated.

On the other hand, when the driving device 21 is operated (used), each of the fixing pins 53 and the storage part 24 continues to receive a load such as vibration caused by the rotation of the driving motor 22 and each of the gears 27, and then a phenomenon (a creep deformation) in which the distortion of the fixing pins 53 and the storage part 24 increases with the lapse of time. If the creep deformation occurs in the area deteriorated by the applying of the lubricant (the inner circumferential surface 47 of the second through hole 42), there is a concern that a crack (a chemical crack) may occur in the area. Therefore, in the driving device 21 (the driving transmission device 23) according to the present embodiment, each of the second through holes 42 and each of the fixing pins 53 is provided with a configuration for suppressing the occurrence of chemical cracks. The following description focuses one fixing pin 53 and one second through hole 42 for convenience of explanation.

Figure 7:
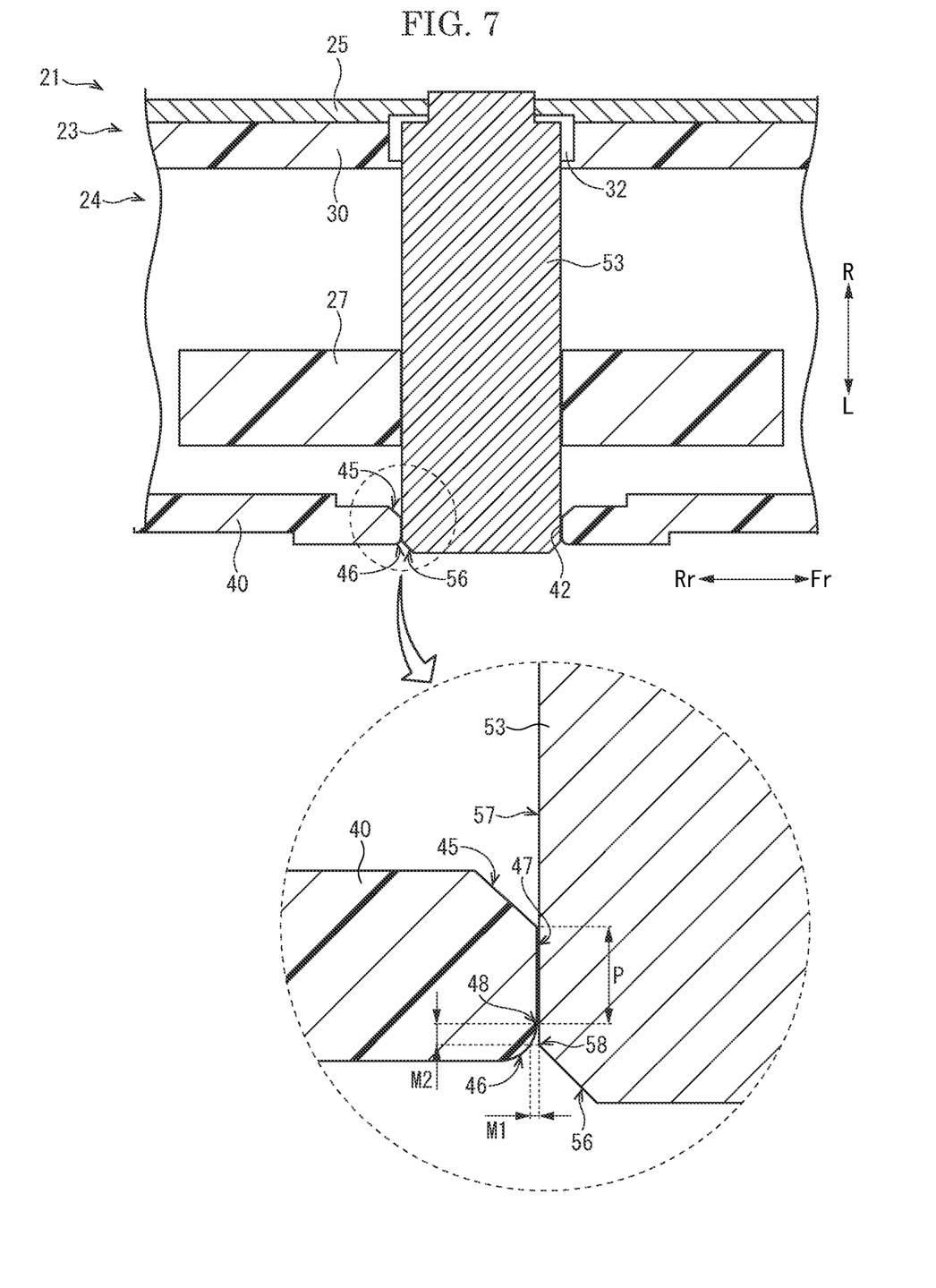
FIG. 7 is a sectional view taken along the line VII-VII of FIG. 6.

With reference to FIG. 7, the configuration for suppressing the occurrence of chemical crack will be described. FIG. 7 is a sectional view (and partially enlarged view) taken along the VII-VII line in FIG. 6.

<Opening Edge of Second Through Hole> The opening edge of the second through hole 42 is formed in a tapered shape so as to widen toward both sides in the left-and-right direction. More specifically, a guide chamfered portion 45 in which a corner is linearly notched is formed at the opening edge of the second through hole 42, on an inner side of the second cover member 40 (on a side of the space in which the gear train is stored). That is, the guide chamfered portion 45 is a so-called C-chamfering. A hole side chamfered portion 46 in which a corner is notched in an arc shape is formed at the opening edge of the second through hole 42, on an outer side of the second cover member 40. That is, the hole side chamfered portion 46 is a so-called R-chamfering. Between the guide chamfered portion 45 and the hole side chamfered portion 46, an inner circumferential surface 47 having substantially the same inner diameter is formed in the left-and-right direction.

<Tip End Portion of Fixing Pin> The tip end portion of the fixing pin 53 is formed in a tapered shape so as to narrow toward the tip end (the left side). Specifically, a shaft side chamfered portion 56 in which a corner is linearly notched is formed at the tip end portion of the fixing pin 53. That is, the shaft side chamfered portion 56 is a so-called C-chamfering. The outer circumferential surface 57 of the fixing pin 53, excluding the shaft side chamfered portion 56, has substantially the same outer diameter in the left-and-right direction.

When the tip end portion of the fixing pin 53 is inserted into the second through hole 42, if the axial center of the fixing pin 53 is slightly shifted from the axial center of the second through hole 42, a part of the shaft side chamfered portion 56 of the fixing pin 53 comes into contact with a part of the guide chamfered portion 45 of the second through hole 42. The tip end portion of the fixing pin 53 (the shaft side chamfered portion 56) smoothly slides on the guide chamfered portion 45 toward the axis of the second through hole 42 due to the effect of the applied lubricant. As a result, the axial centers of the fixing pin 53 and the second through hole 42 substantially coincide with each other, so that the tip end portion of the fixing pin 53 is inserted into (fitted into) the second through hole 42.

In the state where the tip end portion of the fixing pin 53 is inserted (fitted) into the second through hole 42, the lubricant is provided between the outer circumferential surface 57 of the fixing pin 53 and the inner circumferential surface 47 of the second through hole 42 (the contact area P). The tip end surface of the fixing pin 53 penetrate the second through hole 42, and protrudes slightly outward from the outer surface of the second cover member 40.

A hole side boundary portion 48, which is a boundary between the inner circumferential surface 47 of the second through hole 42 and the hole side chamfered portion 46, is in contact with the outer circumferential surface 57 of the fixing pin 53. That is, in FIG. 7, the inner circumferential surface 47 of the second through hole 42 and the hole side boundary portion 48 are in contact with the straight portion of the fixing pin 53. The term "contact" herein means not only direct contact but also contact via the lubricant.

A shaft side boundary portion 58, which is a boundary between the outer circumferential surface 57 of the fixing pin 53 and the shaft side chamfered portion 56, faces the hole side chamfered portion 46 with a gap M1. That is, the shaft side boundary portion 58 does not come into contact with the inner circumferential surface 47 of the second through hole 42 or the hole side chamfered portion 46.

A distance M2 between the hole side boundary portion 48 and the shaft side boundary portion 58 is set in a range of not less than a half the radius (the radius of R-chamfering) of the hole side chamfered portion 46 and not more than the radius. In the present embodiment, as an example, the radius of the hole side chamfered portion 46 is 0.5 mm, and the distance M2 between the hole side boundary portion 48 and the shaft side boundary portion 58 is set to 0.3 mm. The upper limit of the radius of the hole side chamfered portion 46 may be less than the wall thickness of the second cover member 40 excluding the guide chamfered portion 45.

The driving device 21 (the driving transmission device 23) according to the embodiment described above is configured such that the hole side boundary portion 48 is in contact with the outer circumferential surface 57 of the fixing pin 53, and the shaft side boundary portion 58 is not in contact with the hole side chamfered portion 46. According to this configuration, only the outer circumferential surface 57 of the fixing pin 53 comes into surface contact with the inner circumferential surface 47 of the second through hole 42, so that the fixing pin 53 can be securely held by the inner circumferential surface 47 of the second through hole 42. Further, even if the fixing pin 53 and the storage part 24 (the second cover member 40) are creep-deformed, the shaft side boundary portion 58 of the fixing pin 53 does not interfere with the inner circumferential surface 47 of the second through hole 42 and the hole side chamfered portion 46. As a result, a local stress concentration is prevented at the contact area P between the tip end portion of the fixing pin 53 and the inner circumferential surface 47 of the second through hole 42 where the lubricant is applied, so that a chemical crack in the contact area P can be suppressed.

In the driving device 21 (the driving transmission device 23) according to the present embodiment, in a state where the fixing pin 53 is inserted into the second through hole 42, the hole side boundary portion 48 is provided at a position recessed by the predetermined distance M2 from the shaft side boundary portion 58. Thus, the interference between the shaft side boundary portion 58 and the hole side chamfered portion 46 is appropriately prevented, so that the chemical crack at the contact area P between the fixing pin 53 and the second through hole 42 can be effectively prevented.

In the driving device 21 (the driving transmission device 23) according to the present embodiment, the hole side chamfered portion 46 is an R-chamfering and the shaft side chamfered portion 56 is a C-chamfering, but the present disclosure is not limited thereto. At least one of the hole side chamfered portion 46 and the shaft side chamfered portion 56 may be cut out in an arc shape, and for example, both the hole side chamfered portion 46 and the shaft side chamfered portion 56 may be C-chamfered or R-chamfered (not shown). For example, in the case where the hole side boundary portion 48 is C-chamfered, the distance M2 between the hole side boundary portion 48 and the shaft side boundary portion 58 may be set to in a range equal to or greater than the half the distance from the outer surface of the second cover member 40 to the hole side boundary portion 48 and less than the distance (not shown). Further, for example, by making the shaft side chamfered portion 56 R-chamfered, even if the tip end portion of the fixing pin 53 interferes with the edges of the first and second through holes 32, 42 when the fixing pin 53 is inserted into the first and second through holes 32, 42, the tip end portion of the fixing pin 53 can be suppressed from being crushed. Further, although the guide chamfered portion 45 is C-chamfered, it may be R-chamfered or chamfering may be omitted (not shown). The angle of the C-chamfering can be set to any angle.

The driving device 21 (the driving transmission device 23) according to the present embodiment is provided with the plurality of gears 27, the plurality of clutches 28, the plurality of fixing pins 53, and the like, but it is not limited thereto, and at least one gear 27 or the like may be provided. The clutch 28 may be omitted if it is not necessary (not shown).

Further, in the driving device 21 (the driving transmission device 23) according to the present embodiment, the storage part 24 includes the first cover member 30 and the second cover member 40 which can be divided in the left-and-right direction, but the present disclosure is not limited thereto. For example, the storage part 24 may be configured to be divisible in the upper-and-lower direction or may be integrally molded (not shown). For example, the storage part 24 may be divided into three or more parts (not shown).

Although the image forming apparatus 1 according to the present embodiment is a monochrome printer, the present disclosure may be applied to a color printer, a copying machine, a facsimile machine or a multifunction machine, for example.

It should be noted that the description of the above-described embodiment shows one aspect of the driving transmission device, the driving device and the image forming apparatus according to the present disclosure, and the technical scope of the present disclosure is not limited to the above-described embodiment. The present disclosure may be varied, substituted, or modified to the extent that it does not depart from the spirit of the technical idea, and the claims include all embodiments that may be included within the scope of the technical idea.

The invention claimed is:

1. A driving transmission device comprising:
a storage part housing a gear and having a through hole formed corresponding to the gear;
a fixing pin which rotatably supports the gear; and
a supporting part to which the fixing pin is fixed in a state where a tip end portion of the fixing pin is inserted into the through hole, wherein
a hole side chamfered portion in which a corner is notched is formed at an outside opening edge portion of the through hole,
a shaft side chamfered portion in which a corner is notched is formed at the tip end portion of the fixing pin,
in the state where the fixing pin is inserted into the through hole, a lubricant is applied to a contact area between the fixing pin and the through hole,
a hole side boundary portion which is a boundary between an inner circumferential surface of the through hole and the hole side chamfered portion is in contact with an outer circumferential surface of the fixing pin, and
a shaft side boundary portion which is a boundary between the outer circumferential surface of the fixing pin and the shaft side chamfered portion faces the hole side chamfered portion with a gap,
the hole side chamfered portion is notched in an arc shape, and
in the state where the fixing pin is inserted into the through hole, a distance between the hole side boundary portion and the shaft side boundary portion is set in a range of not less than a half a radius of the hole side chamfer portion and not more than the radius.

2. The driving transmission device according to claim 1, wherein
the fixing pin is made of metal, and the storage part is made of resin.

3. The driving transmission device according to claim 1, wherein
a guide chamfered portion in which a corner is notched is formed at an inside opening edge portion of the through hole.

4. A driving device comprising:
a driving source for driving a driven object; and
the driving transmission device according to claim 1, which transmits a driving force of the driving source to the driven object.

5. An image forming apparatus comprising the driving device according to claim 4.

* * * * *